No. 821,544. PATENTED MAY 22, 1906.
W. A. SCOTT.
FISH HOOK.
APPLICATION FILED OCT. 21, 1905.
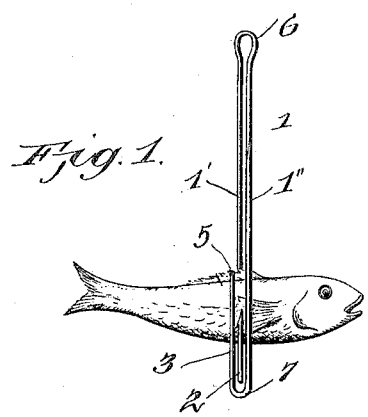
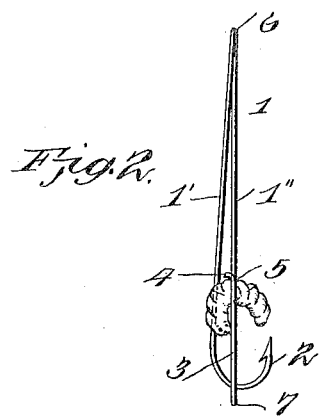
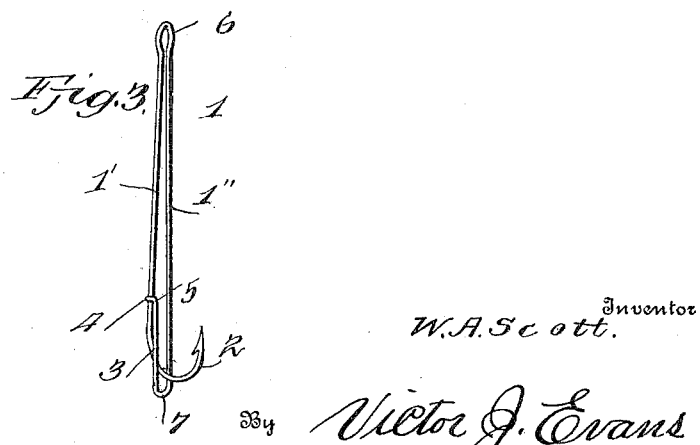
Witnesses
Frank Hough
K. Allen.
Inventor
W. A. Scott.
By Victor J. Evans
Attorney

UNITED STATES PATENT OFFICE.

WILSON A. SCOTT, OF PAUL, NEBRASKA.

FISH-HOOK.

No. 821,544.　　　Specification of Letters Patent.　　Patented May 22, 1906.

Application filed October 21, 1905. Serial No. 283,826.

*To all whom it may concern:*

Be it known that I, WILSON A. SCOTT, a citizen of the United States of America, residing at Paul, in the county of Otoe and State of Nebraska, have invented new and useful Improvements in Fish-Hooks, of which the following is a specification.

The invention relates to fish-hooks.

The object of the invention is to provide a device of said class which will hold a live bait—such as minnows, grasshoppers, &c.—securely and in good shape.

A further object is that the said device will preserve a live bait longer and in better condition.

In the accompanying drawings, Figure 1 represents a front elevation of the hook, showing a minnow secured thereby. Fig. 2 represents a side elevation of the hook, showing a grub-worm secured thereby; and Fig. 3 represents a perspective view of the empty hook.

The same reference characters represent the same parts in all of the figures.

In the drawings, 1 represents the hook composed of a single piece of wire. A loop 6 is formed, to which a line is to be secured. Extending downwardly from the loop are two arms 1' and 1", which form the shank of the hook. The lower end of the arm 1' is curved outwardly and upwardly to form the barb-pointed hook 2. The other arm 1" also extends downwardly laterally, as at 7, and upwardly, as at 3, and terminates in a rearwardly-extending pointed member 4. The curve 7 of the arm 1" is made across the bottom of the curve of the hook 2.

When it is desired to place a bait in the hook, the member 1" is grasped at 7 and pulled forward. The bait is passed between the arm 1' and 1" and below the point 4. Upon releasing the arm 1" it will under pressure of its own spring tension force the arms together and against the bait, thus securely clamping said bait in position and preventing the bait sliding upward on the hook.

If the bait be a small fish, such as a minnow, it can swim around, carrying the hook with it, and will live for a long time.

Having thus described the invention, what I claim as new is—

1. A fish-hook having a bait-clamping means including a spring member having a pointed member, said pointed member being parallel with said spring member.

2. A fish-hook formed from a single piece of wire, comprising a hook member and a bait-clamping member having a U-shaped member extending around said hook member.

3. A fish-hook formed from a single piece of spring-wire, comprising a hook member and spring bait-clamping member, passing under said hook member.

4. A fish-hook composed of a single piece of spring-wire comprising a hook member, and spring bait-clamping member, having a pointed member extending at right angles thereto.

In testimony whereof I affix my signature in presence of two witnesses.

WILSON A. SCOTT.

Witnesses:
　JESS OELKE,
　W. F. MORAN.